(12) United States Patent
Gower

(10) Patent No.: US 8,441,486 B2
(45) Date of Patent: May 14, 2013

(54) POSITION TRACKING IN A VIRTUAL WORLD

(75) Inventor: Andrew Gower, Cambridge (GB)

(73) Assignee: Jagex Ltd., Cambridge (GB)

( * ) Notice: Subject to any disclaimer, the term of this patent is extended or adjusted under 35 U.S.C. 154(b) by 930 days.

(21) Appl. No.: 12/430,578

(22) Filed: Apr. 27, 2009

(65) Prior Publication Data

US 2010/0275136 A1 Oct. 28, 2010

(51) Int. Cl.
*G06T 13/00* (2011.01)

(52) U.S. Cl.
USPC .......................................... 345/474; 715/706

(58) Field of Classification Search .................. 345/474; 715/706
See application file for complete search history.

(56) References Cited

U.S. PATENT DOCUMENTS

| | | | | |
|---|---|---|---|---|
| 5,736,982 | A * | 4/1998 | Suzuki et al. ................. | 715/706 |
| 6,219,045 | B1 | 4/2001 | Leahy et al. | |
| 7,181,690 | B1 | 2/2007 | Leahy et al. | |
| 7,493,558 | B2 | 2/2009 | Leahy et al. | |
| 2002/0086730 | A1 | 7/2002 | Nakai | |
| 2005/0193120 | A1 | 9/2005 | Taylor | |
| 2006/0031578 | A1* | 2/2006 | Pelletier ........................ | 709/245 |

FOREIGN PATENT DOCUMENTS

| | | |
|---|---|---|
| GB | 2447020 A | 9/2008 |
| JP | 10-057628 | 3/1998 |
| JP | 11-025288 | 1/1999 |
| JP | 2002-253866 A | 9/2002 |
| JP | 2003-085116 | 3/2003 |
| JP | 2004-041646 | 2/2004 |
| JP | 2004-329682 | 11/2004 |
| WO | 2008/104782 A2 | 9/2008 |
| WO | 2008/109798 A2 | 9/2008 |
| WO | 2008109798 A2 | 9/2008 |

OTHER PUBLICATIONS

Hoch et al. "Individual and Group Interaction", CID-91, KTH, Stockholm, Sweden Aug. 1999, pp. 8-16.*
K. Ward et al. "A Simulation-based VR System for Interactive Hairstyling", Virtual Reality, 2006, IEEE Alexandria, VA, USA Mar. 25-29, 2006, 4 pages.
International Search Report and Written Opinion for Application No. PCT/IB2010/000727, mailed Oct. 18, 2010, 16 pages.
Notice of Reasons for Rejection for related Japanese patent application No. 2012-507832 mailed Mar. 28, 2013.

* cited by examiner

*Primary Examiner* — Maurice L McDowell, Jr.
(74) *Attorney, Agent, or Firm* — Banner & Witcoff, Ltd.

(57) ABSTRACT

Positions of avatars in a virtual world may be communicated to clients using multiple bitcode resolutions to minimize required communication bandwidth between a virtual world server and virtual world clients, thereby allowing transmission of all avatars' positions to every other player. Lower resolution bitcodes may be based on a lower resolution grid overlaid on the virtual world, whereas higher resolution bitcodes may be based on a higher resolution grid overlaid on the virtual world. In one example, a virtual world server may determine the bitcode resolution to use based on a distance between an avatar to which the position information is to be sent and other avatars in the virtual world. Resolution may include spatial resolution, where nearer avatars' locations are provided with higher resolution bitcodes, or temporal resolution, where the transmission frequency of position information is greater for nearer avatars. Position information in a transmission stream may further be condensed by using run length encoding.

46 Claims, 12 Drawing Sheets

| BIT CODE | BITS | DESCRIPTION |
|---|---|---|
| 0 | 1 | Avatar is in same cell |
| 1 000 | 4 | Switch to low resolution |
| 1 001 rrr | 7 | Movement to adjacent cell |
| 1 010 rrr | 8 | Movement to cell exactly 2 cells away |
| 1 011 0 yyxxxxxxzzzzzz | 17 | Movement to cell over 2 cells away but between -16 and 15 cells away |
| 1 011 1 yyxxxxxxxxxxzzzzzzzzzzz | 35 | Movement over -16 to 15 cells away |
| 1 100 | 4 | Avatar is in same cell and extended information follows |
| 1 101 rrr | 7 | Movement to adjacent cell and extended information follows |
| 1 110 rrr | 8 | Movement to cell exactly 2 cells away and extended information follows |
| 1 111 0 yyxxxxxxzzzzzz | 17 | Movement to cell over 2 cells away but between -16 and 15 cells away and extended information follows |
| 1 111 1 yyxxxxxxxxxxzzzzzzzzzzz | 35 | Movement over -16 to 15 cells away and extended information follows |

601 (rows 1-6), 603 (rows 7-11)

FIG. 6A

| BIT CODE | BITS | DESCRIPTION |
|---|---|---|
| 0 | 1 | Avatar is in same cell |
| 1 00 xxxxxx zzzzzz | 15 | Switch to high resolution using additional precision information |
| 1 01 yy | 5 | Same cell, different layer |
| 1 10 yy rrr | 8 | Movement to adjacent cell and/or switched layers |
| 1 11 yy xxxxxxx zzzzzzz | 21 | Movement to cell other than adjacent cells |

FIG. 6B

POSITION TRACKING IN A VIRTUAL WORLD

BACKGROUND

Virtual worlds provide graphically rendered simulated environments in which multiple individuals may jointly participate in a shared experience. For example, virtual worlds have been used to simulate fictional gaming environments, real world locations and surroundings and real life activities and interactions. Typically, users may operate a client application or module on their own computer or other device while interfacing with a virtual world server that coordinates and manages data corresponding to multiple clients.

One aspect of creating and managing a virtual world is the tracking and identification of user positions within the environment. In particular, the position of one character or user (represented by an avatar) generally needs to be broadcast to other characters or users so that the other characters or users' clients can graphically depict avatars based on location, and allow communication between appropriately located avatars. This allows a user to see other users within a viewable proximity in the virtual world and also allows the client application to determine when to render other avatars on the user's display. In some instances, a virtual world may include hundreds of thousands (or more) simultaneous users. Accordingly, the amount of bandwidth required to transmit the positions of each avatar may be substantial.

One known method for determining which avatar positions to transmit to a given client is described in U.S. Pat. No. 7,181,690 ("Leahy '690") and U.S. Pat. No. 7,493,558 ("Leahy '558'), both to Leahy et al. In both Leahy '690 and Leahy '558, the server is configured to determine a list of N avatars, and their positions, nearest to the location of the user, and transmit such information to the user's client software. In Leahy, the list of N avatars nearest to the location of the user may represent less than all of the users occupying the virtual world. Such a solution is not preferred, however, because a user knows nothing about distant users at all, which makes it difficult for the user to located distantly-located friends, find a quiet area in the virtual world to perform some action in relative isolation, or locate a crowded area in the virtual world to interact with many other users.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One or more aspects described herein relate to the transmission of position information of avatars in a virtual world. For example, a virtual world system may be configured to determine a grid resolution at which to report position movement information for a first avatar, where the grid resolution is based on selecting a grid from a plurality of grids having different grid resolutions, and where each grid corresponds to the virtual world. The virtual world system may then determine the position movement information of the first avatar by comparing a current position of the avatar in the selected grid with a previous position of the avatar in the selected grid, and then transmit the position movement information of the first avatar to a client connected to the virtual world system.

According to other aspects described herein, a virtual world server may determine a current position of each of a plurality of avatars in the virtual world, where the plurality of avatars includes all avatars in the virtual world. The virtual world server may then generate first position offset data for each of the plurality of avatars based on the current position of each of the plurality of avatars compared to a corresponding previous position of each of the plurality of avatars in a first grid corresponding to the virtual world, and generate second position offset data for each of the plurality of avatars based on the current position of each of the plurality of avatars compared to a corresponding previous position of each of the plurality of avatars in a second grid corresponding to the virtual world. The first grid and the second grid have different resolutions. The virtual world server then selects, for each of the plurality of avatars, only one of the first position offset data and the second position offset data for transmission to a first virtual world client device, and transmits to the first virtual world client device the selected position offset data for at least all of the plurality of avatars.

According to another aspect, a high resolution range/threshold may be modified based on a number of avatars in the high resolution range from a position of a specific avatar. For example, if the number of avatars in the high resolution range is above an avatar threshold, the high resolution range may be decreased until the number of avatars is at or below the avatar threshold, and then the system may use high-resolution bitcodes when sending position information for avatars within the high resolution range, and low resolution bitcodes when sending position information for avatars outside the high resolution range.

According to another aspect, bitcodes may be formatted into a transmission stream. Additionally or alternatively, consecutive bitcodes of a certain type (e.g., stationary avatars) may be condensed into a shortened bitcode using run length encoding (RLE). For example, position change information for a series of 100 consecutive stationary avatars may be condensed to a single 11 bit RLE bitcode representing all 100 stationary avatars.

According to another aspect, a single pair of low resolution and high resolution position bitcodes for each avatar may be pre-generated by a virtual world system to reduce processing time. A virtual world system may select from the high resolution and the low resolution position information based on the type of position information reported to a receiving client in the previous update. For some clients, a bitcode may be generated on-the-fly if the clients do not have the most recent position information for one or more other avatars.

According to other aspects describe herein, a receiving client device may receive position offset information for a plurality of avatars in a virtual world. For each avatar for which position offset information is received, the client device determines a resolution of the position offset information and applies the received position offset information based on the determined resolution to determine a new position of the avatar corresponding to the position offset information. The position offset information corresponding to a first avatar is received in a first resolution, and position offset information corresponding to a second avatar is received in a second resolution.

BRIEF DESCRIPTION OF THE DRAWINGS

Certain embodiments are illustrated by way of example and not limited in the accompanying figures in which like reference numerals indicate similar elements and in which:

FIGS. 6A and 6B illustrate example bitcodes representing positions of avatars in a virtual world according to one or more aspects described herein.

DETAILED DESCRIPTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

By way of introduction, aspects described herein relate to the transmission of position information of avatars in a virtual world. A virtual world server may be configured to determine positions of avatars in the virtual world and determine whether to use high resolution or low resolution bitcodes when sending avatar positions to each of the multitude of clients connected to the virtual world. Bitcode resolution may vary spatially or temporally. For example, positions of other avatars close to a user's avatar may be determined and transmitted using a first bitcode resolution while positions of other avatars further away from the user's avatar may be determined and transmitted at a lower second bitcode resolution, thereby conserving bandwidth while still providing position information for all avatars in the virtual world. Where temporal resolution is used, positions of nearer avatars may be sent more often than positions of avatars located farther away.

As used herein, a virtual world refers to a graphically rendered or graphically simulated environment in which many users interact with each other, against each other, for a common purpose, or to play a common game. A virtual world typically refers to an environment intended for simultaneous use by thousands or more users, or even millions or more users, at the same time. A virtual world may be graphically depicted to resemble a real-life location, a science fiction environment, a fantasy environment, or any other location as desired by the virtual world proprietor.

Figure 1:
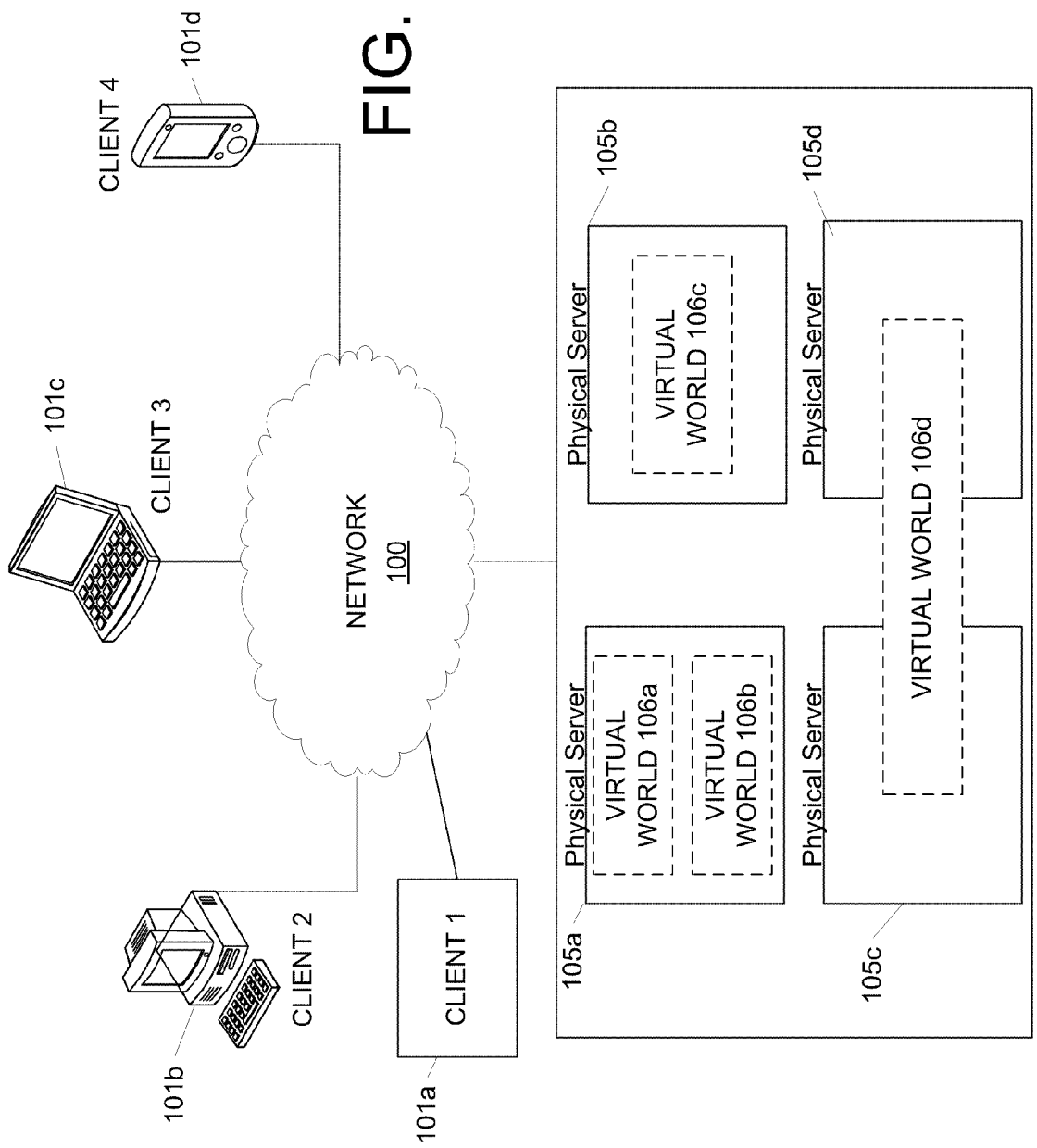
FIG. 1 is an illustrative network environment in which one or more aspects described herein may be used.

FIG. 1 illustrates a network environment in which clients 101 may interact with virtual world servers 106. Clients 101 may include a variety of devices including generic data processing device 101a, personal computer (PC) 101b, laptop, portable, or netbook computer 101c, personal data assistant or mobile device 101d, a mobile communication device (not shown) and the like. Each of clients 101 may have a network adapter that allows clients 101 to connect to virtual world servers 106 through network 100. In one example, network 100 may include an Internet Protocol (IP) based network, e.g., the Internet. Other networks may include cellular networks, cable networks, fiber optic networks, wireless networks, wired network and/or combinations thereof. Network 100 may further include one or more sub-networks such as wired or wireless local area networks (LANs) and the like.

One or more physical servers 105 may be used to run one or more instances of the virtual world server software 106. Each physical server may be a similar data processing device as clients 101, and/or may include specialized server hardware. Each running instance of the server software 106 creates exactly one virtual world. There is not necessarily a correlation between the number of physical servers and number of copies of the server software being run. For instance one powerful server 105a could run multiple virtual worlds 106a and 106b, or several less powerful servers 105c and 105d could be connected in a cluster to work together to run one large virtual world 106d. As described herein 'server' is used to refer to a single instance of the server software 106, (i.e., a single stand alone instance of the virtual world). A server does not necessarily refer to the underlying hardware server 105.

Figure 2:
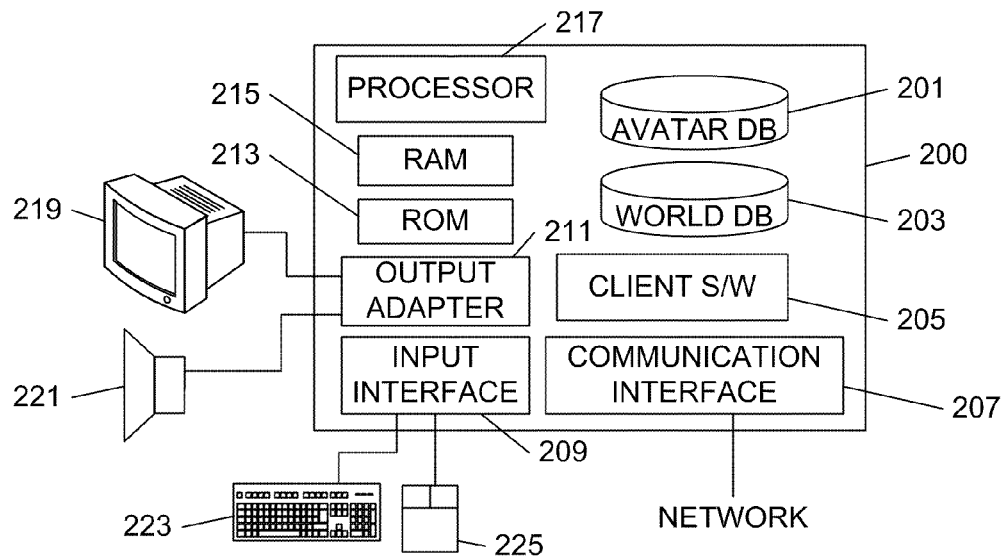
FIG. 2 is a block diagram illustrating an example virtual world client according to one or more aspects described herein.

FIG. 2 illustrates an example client device 200 such as PC 101b (FIG. 1) that may be used to access and interact with a virtual world provided by a virtual world server such as server 106a of FIG. 1. Client device 200 may include a variety of components and modules including a processor 217, random access memory (RAM) 215, read only memory (ROM) 213, databases 201 and 203, renderer 205, output adapter 211, input interface 209 and communication interface 207. Processor 217 may include a graphics processing unit (GPU) or a separate GPU may be included in the output adapter 211. Avatar database 201 may be configured to store data defining and otherwise associated with an avatar used by a user of device 200 to explore and interact with the virtual world. Avatar information may include avatar characteristics (e.g., strength, skin color, eye color, hair length, height, weight, intelligence), avatar position/location information, objects associated with the avatar (e.g., inventory, clothes, weapons, accessories) and the like. World database 203, on the other hand, may be configured to store data for defining and generating the environment in which the avatars exist. For example, world database 203 may store texture maps for rendering a floor or ground, walls, a sky and the like. In another example, world database 203 may store simulated weather data, accessible versus non-accessible areas, colors, interactive components of the world (vs. non-interactive components), data defining inanimate objects existing in the world, data defining computer controlled characters and the like. Each of database 201, 203 may or may not be a conventional database, and instead may refer to data stored in RAM memory, accessed as needed by the client software. Data associated with an avatar or the virtual world may be communicated between client device 200 and a virtual world server using communication interface 207. For example, avatar positions, attributes and status may be updated or environments may be changed by communicating such data through interface 207.

The world and the avatars may be rendered by client software 205 and subsequently sent to output adapter 211 and display 219. The client software 205 may, in one or more arrangements, be configured to generated three dimensional (3-D) models of the virtual world and components thereof as well as the avatar corresponding to a user. A user may control the avatar and interact with the world through input interface 209 using various types of input devices including keyboard 223 and mouse 225. Other types of input devices may include a microphone (e.g., for voice communications over the network), joysticks, motion sensing devices and/or combinations thereof. In one or more arrangements, music or other audio such as speech may be included as part of the virtual world. In such instances, the audio may be outputted through speaker 221.

Client software 205, computer executable instructions, and other data used by processor 217 and other components of client device 200 may be stored RAM 215, ROM 213 or a combination thereof. Other types of memory may also be used, including both volatile and nonvolatile memory. Software 205 may be stored within RAM 215, ROM 213 and/or databases 201 and 203 to provide instructions to processor 217 such that when the instructions are executed, processor 217, client device 200 and/or other components thereof are caused to perform functions and methods described herein. In one example, instructions for generating a user interface for interfacing with the virtual world server may be stored in RAM 215, ROM 213 and/or databases 201 and 203. Client software 205 may include both applications and operating system software, and may include code segments, instructions, applets, pre-compiled code, compiled code, computer programs, program modules, engines, program logic, and combinations thereof. Computer executable instructions and data may further be stored on some physical form of computer readable storage media (referred to herein as "computer memory") including, e.g., electrically erasable programmable read-only memory (EEPROM), flash memory or other memory technology, CD-ROM, DVD or other optical disk storage, magnetic cassettes, magnetic tape, magnetic storage and the like.

Figure 4:
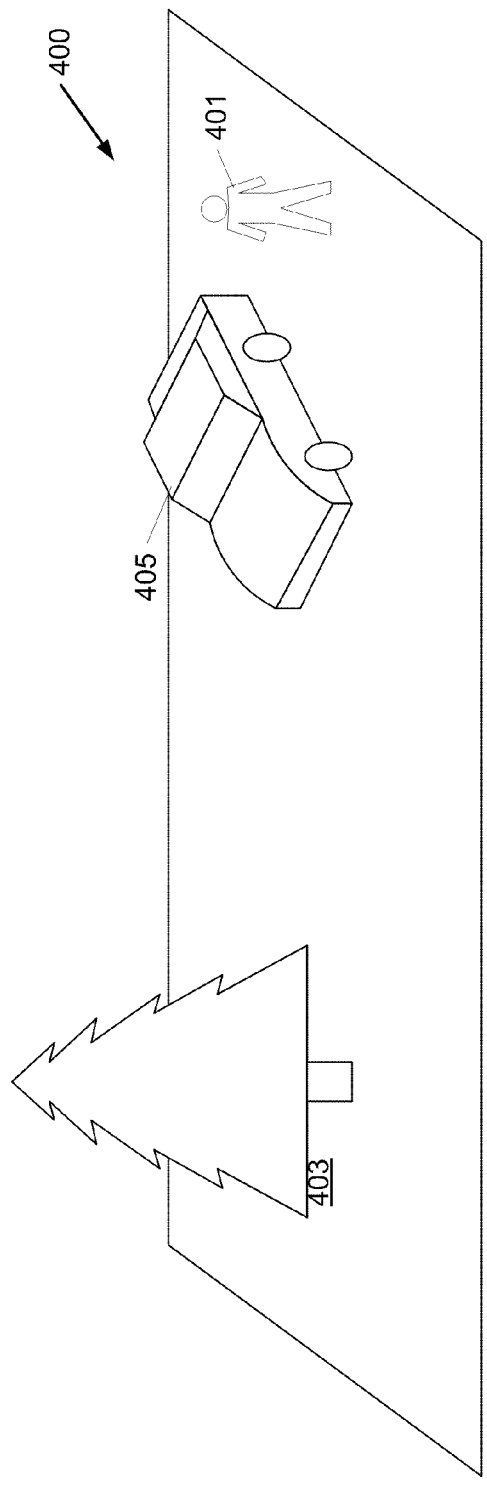
FIG. 4 illustrates an illustrative virtual world according to one or more aspects described herein.

Referring ahead to FIG. 4, users may travel and interact with each other within illustrative virtual world 400. Each user may be represented as an avatar (e.g., avatar 401), which is a graphical depiction representative of a user in the virtual world. Virtual world 400 may include a tree 403 and a car 405. An avatar 401 may be rendered and placed within virtual world 400 at a specified position. Using controls as described above with respect to FIG. 2, a user may move avatar 401 to modify avatar 401's position. For example, the user may move avatar 401 closer to car 405 or closer to tree 403. Car 405 or tree 403 or both may be interactive. That is, a user may control his or her avatar 401 to, for example, open the doors of car 405 to enter the car and drive away, or chop down tree 403 to obtain wood for a fire. Although some aspects of virtual world 400 are illustrated as two dimensional (2-D), those aspects may also be generated as 3-D objects with, optionally, texture and colors.

Figure 3:
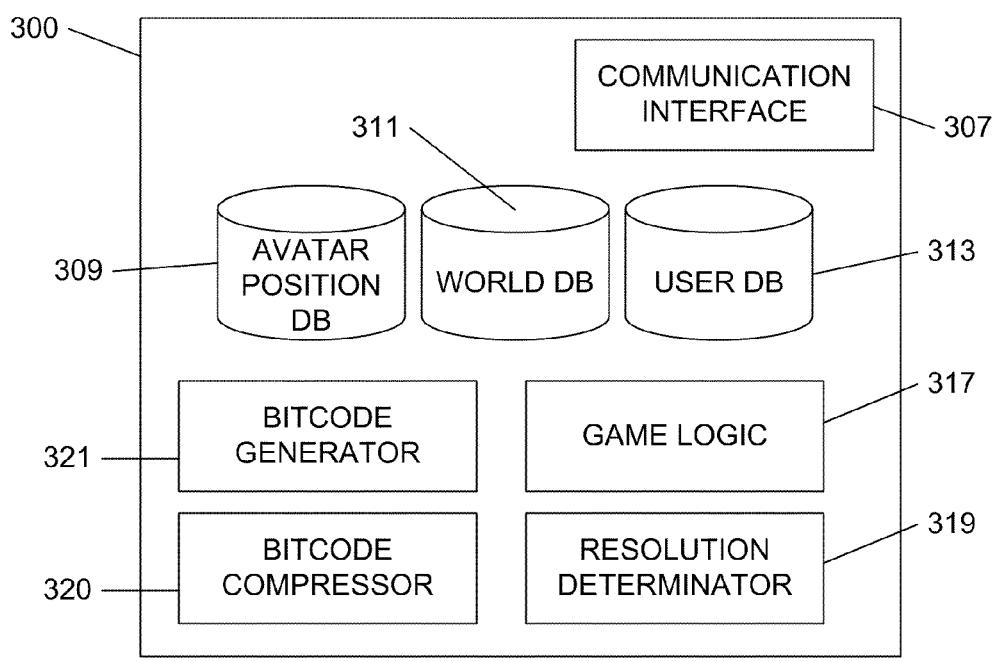
FIG. 3 is a block diagram illustrating an example virtual world server according to one or more aspects described herein.

Referring to FIG. 3, a virtual world server 300 may be configured to generate and operate a virtual world such as virtual world 400 of FIG. 4. Server 300 may include, communication interface 307, avatar position database 309, world database 311, user database 313, game logic 317, resolution determinator 319, bitcode compressor 320, and bitcode generator 321. The physical hardware on which the server(s) execute may comprise any server hardware or data processing device suitable for such tasks, e.g., including one or more central processing unit (CPU), graphics processing unit (GPU), RAM, ROM, network interface, nonvolatile memory, input/output interface, and the like (not shown).

Avatar position database 309 may be configured to store position information for each avatar (e.g., based on movement commands received from each client). World database 311 may store rules, algorithms and other data for interactions that are available in the world. For example, a manner in which a computer controller character moves or otherwise behaves may be defined in data stored in world database 311. Additionally, item information may be defined in world database 311 so that items may not be modified by each client. In another example, world database 311 may store location information for non-avatar items and components. User database 313, on the other hand, may be configured to store information describing a user controlling an avatar. For example, user database 313 may include account information, user preferences, payment information, user identification information, character definitions, and the like. Each of databases 309, 311, 313 may or may not be a conventional database, and instead may refer to data stored in RAM memory, accessed as needed by the server software. For example, position database 309 may in fact be a collection of avatar positions stored in RAM, updated as described herein.

An avatar's position may be stored on the server using a coordinate system based on the size of the virtual world. In a 3-D space, the avatar's position may be defined as a set of x, y, z coordinates corresponding to each of the three dimensions. In a 2-D space, the avatar's position may be represented by a set of x, y (or x, z) coordinates corresponding to the two dimensions. In one example, a virtual world may be divided into 4 layers, each layer representing a space 10 km×10 km in size.

Figure 5A:
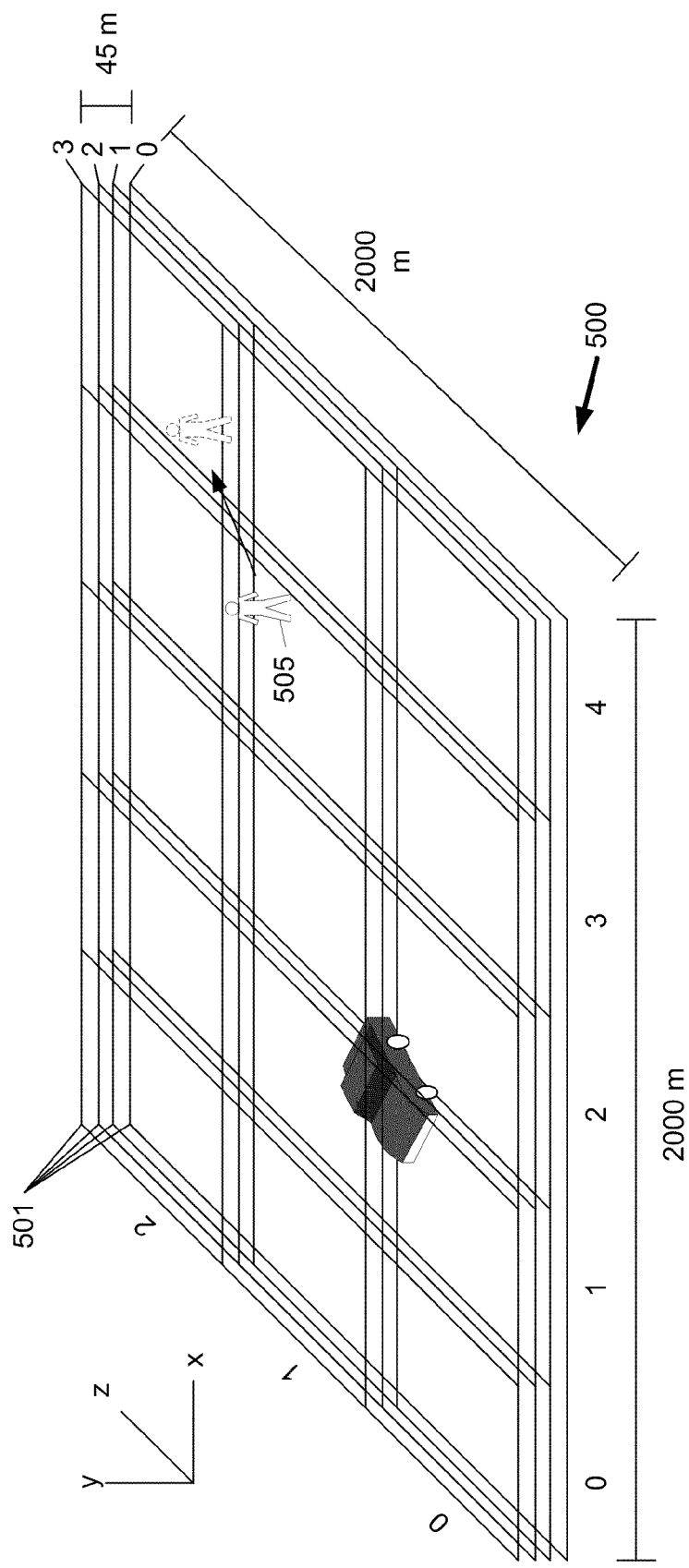
FIGS. 5A and 5B illustrate an example virtual world having grid systems of two different grid resolutions according to one or more aspects described herein.

To communicate a user's position the server may divide the world using a grid, and then communicating which grid cell each user is located in. FIG. 5A illustrates an example grid system of a first grid resolution that may be used to communicate an avatar's position in a virtual world. The resolution of the grid used to communicate the avatar's position to the client may be equal to or lower than the resolution of the coordinate system used to store the avatar's position on the server. The grid 500 may be divided into a set of stacked layers 501 that are each divided into a set of cells. In one embodiment, each layer represents a predefined range, elevation or "thickness" of vertical distance, e.g., a first layer may represent from ground level to 5 meters above ground level; layer 2 may represent 15 m above ground level, etc. Layer thickness may be higher or lower, as desired. In another embodiment, layers might instead refer to discrete portions of the world above ground level, regardless of what the ground level actually is. For example, regardless of whether the ground elevation is 1 m, 4 m, or 13 m, all avatars standing on the ground might be included in layer 0; all avatars standing on the first floor above the ground floor of any building might be located in layer 1 (regardless of the ceiling height in each building); all avatars standing on the second floor above the ground floor of any building might be located in layer 2; etc. The avatar's position may then be communicated by identifying the coordinates of the grid cell in which the avatar (e.g., avatar 505) is located. Thus, in grid 500, avatar 505's position may be communicated as (3, 0, 1) corresponding to the x, y and z coordinates, respectively. The layer associated with the avatar 505's position may be defined by the lowest layer intersecting avatar 505 (e.g., based on the avatar's feet which, in the illustrated example, are on layer 0), or the layer as otherwise determined by the virtual world software. The grid system 500 illustrated in FIG. 5A may be said to have a resolution of 5×4×3 (representing x, y and z, respectively) cells within the 2000 m×2000 m×45 m world.

Figure 5B:
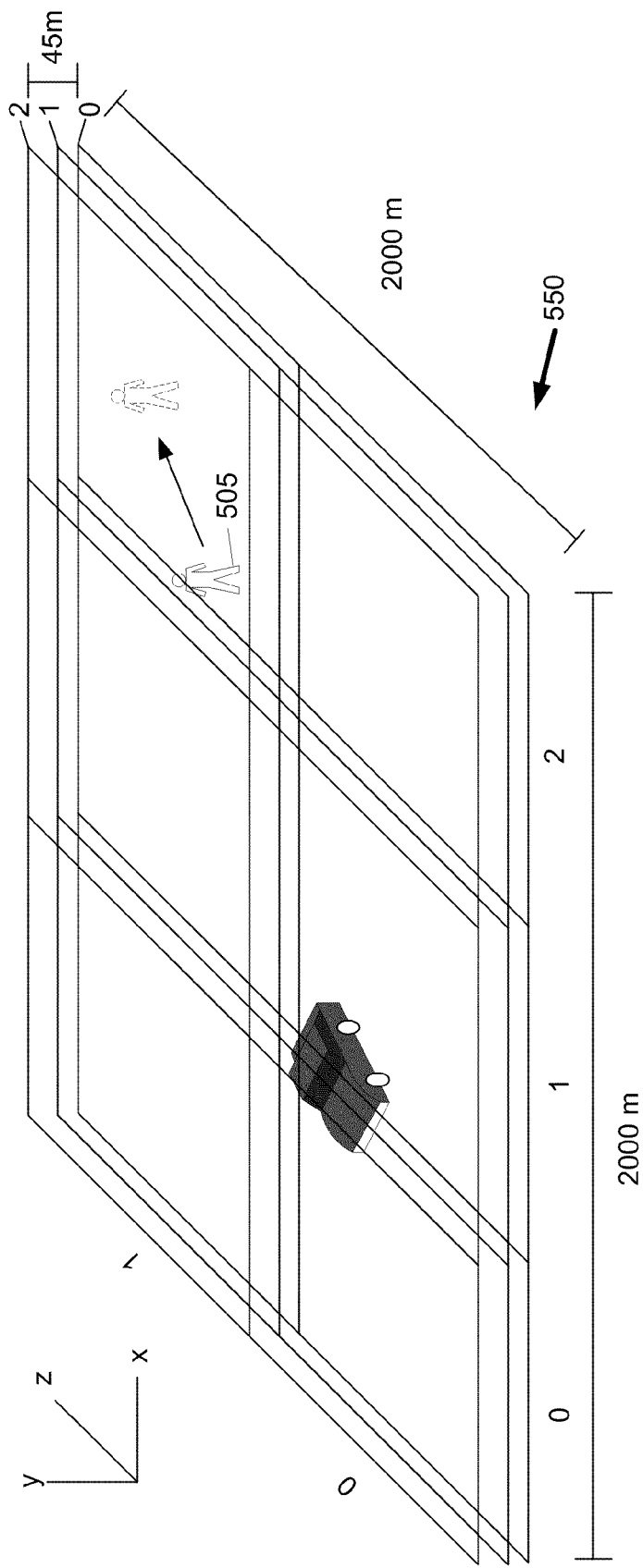

FIG. 5B illustrates an example grid system of a second resolution that may be used in conjunction with the grid system 500 of FIG. 5A. FIGS. 5A and 5B represent the same virtual world overlaid using two different resolution grids. The second resolution corresponds to a grid of 3×3×2 cells and is thus coarser or less granular than the resolution of grid 500 in FIG. 5A. The use of a coarser or lower resolution grid results in lower resolution bitcodes (described below) used to send the avatar's position to other users, and may aid in reducing the amount of data that needs to be transmitted to clients indicating a change in position because fewer changes in position will result in a change in location within the lower resolution grid. In one example, if a grid has a lower resolution, an avatar 505's position change might not be detected because the position of avatar 505 might not change from a first cell to a second cell. Because movement within a grid cell would not be detected, the avatar 505's position change would not register using the low resolution grid of FIG. 5B. In FIG. 5A, however, the same position change would register as crossing into another cell, namely cell (4, 0, 2).

Referring again to FIG. 3, once the game logic 317 has determined or updated an avatar's position in position database 309, the server instructs bitcode generator 321 to determine which cell of the high resolution grid the user's position falls within and prepare a corresponding high-resolution bit-code and to determine which cell of the low resolution grid the user's position falls within and prepare a corresponding low-resolution bitcode. These bitcodes represent any movement by that avatar in each respective grid since the last position update.

The server may update all clients/avatars with position information of all other clients/avatars by sending either the high-resolution bitcode or the low-resolution bitcode, as further described below. In other configurations, the server may update each client with less than all the other avatars' positions in a given transmission (e.g., when using temporal resolution in addition to or instead of spatial resolution), while still eventually sending position information for all avatars within a given amount of time (based on the maximum latency of the temporal resolution). Resolution, as used herein, refers to either a spatial or temporal accuracy with which a position is indicated. Spatial resolution refers to the physical granularity with which a user's position may be determined in a given space. Temporal resolution, on the other hand, may correspond to a frequency with which position information is sent (e.g., the more frequently position information is provided, the more accurate an avatar's position will typically be).

When using spatial resolution, resolution determinator 319 may be configured to determine whether to send an avatar's position to a given client using the high-resolution bitcode or the low-resolution bitcode, as further described below. When using temporal resolution, resolution determinator 319 may be configured to determine whether to send an avatar's position to a given client during a given frame, as further described below. Spatial and temporal resolution may be used individually or concurrently in various embodiments described herein.

A virtual world system may need to perform a significant number of calculations for generating bitcodes if the number of avatars is large because each client may need positional information for every other avatar in the virtual world (assuming each avatar corresponds to a unique client). Thus, if a world has 2000 avatars, the system may need to generate (and/or send) 2000×2000 (4 million) bitcodes, i.e., one set of 2000 bitcodes for each client. To reduce this processing load, the system might pre-generate a pair of bitcodes for each avatar where the first bitcode corresponds to a low resolution grid change since the last frame and the second bitcode corresponds to a high resolution grid change since the last frame. When position information is to be sent to each client, one of the two pre-generated bitcodes may be selected based on whether the receiving client received a high resolution or low resolution bitcode for an avatar in the previous update or frame. Because the bitcodes have already been generated, the selection may be made without having to calculate the bit-codes on the fly. In some cases, however, a bitcode may still be generated on the fly. For example, if a client missed a previous position update (e.g., network bandwidth usage required that the last frame of position information be dropped), special bitcodes may need to be generated because the previous position information of which the client is aware is different from the previous position information used to determine the pre-generated bitcodes.bitcode In one or more arrangements, positions for all active avatars in a virtual world are sent to all other active avatars. An avatar may be considered active if the avatar is logged into the virtual world. Sending positions for all active avatars may allow a user to identify areas of the world having desired population statistics. For example, a user may be able to find a quiet place in the virtual world by identifying the locations of all other users and selecting an area having a desired population density (assuming more people corresponds to more activity and noise). In other arrangements, positions for less than all active avatars in the virtual world may be sent to other active avatars within a first temporal resolution, with position information for all active avatars sent within a second temporal resolution.

The methods and systems described herein relating to the transmission and calculation of avatar positions may rely on the previous position of each avatar. That is, position information might be sent as "movement" information, where the movement information indicates how much the avatar has moved since the last update, if at all. Thus, to determine the new position of a first avatar, a client corresponding to a second avatar may need to have the previous position of the first avatar. In situations where a user first connects to the world, the user's client might not have knowledge of the previous positions of other avatars in the world. Accordingly, the virtual world system may prepare a setup packet to the connecting user's client providing the position of every other avatar in the system using low resolution bitcodes. The virtual world system may provide the initial position information based on a previous position of (0, 0, 0) for all other avatars. This allows the connecting client to determine the position of the other avatars using a known starting position (e.g., (0, 0, 0)).

As indicated above, bitcode generator 321 may generate bitcodes using both a high resolution format and a low resolution format. In other embodiments, more than two resolutions of bitcodes may be used. Bitcodes may be prefix codes (sometimes referred to as Huffman codes), i.e., there is no valid bitcode that is a prefix (start) of any other valid bitcode in the set. Using prefix codes negates the need to use an end code or other special marker to designate when a code or information provided with a code is finished. FIG. 6A illustrates example high-resolution bitcode sets 601 and 603 that may be generated and transmitted to provide avatar position information, where the resolution corresponds to a grid having 4 layers and 12800×12800 grid cells per layer. In one example, a bitcode of '0' (1 bit) may be used to indicate that a user's avatar has not changed grid cell and therefore has not made a detectable change in position. If the user's avatar has changed grid cell, but only to a cell in the same layer as and adjacent to his or her previous cell, a bitcode of '1 000 rrr' (7 bits) may be used, where rrr is a 3 bitcode specifying which of the adjacent 8 cells the avatar has moved (using a preagreed upon correlation between client and server regarding which bitcode for 'rrr' refers to each adjacent cell). The adjacent cells may be numbered in a variety of manners including counterclockwise or clockwise around the avatar's previous cell. Alternatively, if the user's avatar has moved 2 cells away within the same layer, a bitcode of '1 010 rrrr' may be generated where rrrr is a 4 bitcode identifying one of the 16 cells that are exactly 2 cells away from the avatar's previous grid cell.

Changes in position that involve a change in layer, or involve movement of more than 2 cells but between −16 and 15 cells away may be represented by the following 17 bit bitcode: '1 011 0 yyxxxxxzzzzz' where yy=(new layer−old layer)&3, xxxxx=(new x−old x)&31, and zzzzz=(new z−old z)&31. To determine whether a change in position is between −16 and 15 cells away, a grid into which the virtual world is divided may have designated negative (−) and positive (+) directions. Thus, moving to the right along the x axis may be considered positive movement while moving to the left along the x axis may be considered negative movement. Accordingly, a distance of −16 may represent 16 cells away in one direction along an axis and a distance of positive 15 may represent 15 cells away in the opposite direction. The '&' symbol used herein represents the binary AND operation, and is used to create a bitmask of the position bits for each dimension. This 17 bit bitcode may be sent as an unsigned number with wrap around. For example, if a user moves from a top layer to a bottom layer of a 4 layer grid, yy may be set to 1 (i.e., instead of −3) to signify a wraparound from the top layer to the bottom layer. In instances where an avatar moves a distance greater than −16 to 15 cells away, a 35 bit bitcode of the form '1 011 1 yyxxxxxxxxxxxxxxxxzzzzzzzzzzzzzzzz' may be used, where yy=(new layer−old layer)&3, xxxxx=(new x−old x)&16383, and zzzzz=(new z−old z)&16383. In one or more arrangements, the values with which the x, y and z distances are AND'd (e.g., 3, 31, 16383) may change based on the size or resolution of the position grid. Typically the value against which a distance moved in a given dimension is masked (using binary AND) to create the bitmask is the binary representation of $2^n-1$, where n represents the number of bits needed to represent that dimension in the grid.

Bitcodes 603 repeat bitcodes 601 with the exception of the $2^{nd}$ bit in each bitcode sequence. The second bit of bitcodes 603, instead of being '0' as is the case in bitcodes 601, has a value of '1'. This change in the second bit may represent or indicate to a client that additional information about the avatar follows or is included in the transmission. In the example of the bitcode '1 100' indicating that the avatar's position has not changed, the second bit having a value of '1' may indicate that some other aspect of the avatar has changed (e.g., a height, living vs. dead, health, etc.). Each of bitcodes 603 respective meanings are indicated in FIG. 6A.

FIG. 6B illustrates a series of low-resolution bitcodes 605 that may be generated and transmitted to provide avatar position information, where the low resolution bitcode corresponds to the same avatar position relied upon by the high-resolution bitcodes, but communicated based on a grid having 4 layers and 200 by 200 grid cells per layer. As with bitcodes 601, 603, bitcodes 605 may also adhere to prefix code rules. However, because bitcodes 601, 603 conflict with bitcodes 605 if used together as prefix codes, the recipient must know which set of codes are in use for each avatar. Thus, in this example the recipient always assumes that the bitcode resolution is the same as the last bitcode resolution received for an avatar. As indicated in FIG. 6B, the maximum amount of bandwidth that is needed to report any position change using a low resolution grid of 200×4×200 (x,y,z) size is 21 bits, because any specific grid cell can be unambiguously specified using a 21-bit bitcode, as shown in FIG. 6B. In addition, even when a switch to the high-resolution grid is indicated by the code '1 00', the high-resolution bitcode can be extrapolated from the low-resolution bitcode by providing the specific high-resolution grid cell within the existing low-resolution grid cell in which the avatar is located That is, in this example each low-resolution grid cell comprises 64×64 high-resolution grid cells. Therefore, any high-resolution grid cell can be unambiguously extrapolated from a low-resolution grid cell using an identification of the specific high-resolution grid cell within the low-resolution grid cell in which the avatar is located. Because there are $2^6$ by $2^6$ high-resolution grid cells per low-resolution grid cell, 6+6 (i.e., 12) additional bits are all that are needed to switch to high-resolution beyond the 3-bitcode '1 00'. Additionally, in contrast to high resolution bitcode reporting, a bitcode indicating additional information might not be specified or included with low resolution bitcode information under the assumption that if a position is being reported with a low resolution bitcode, additional information would not be relevant or important.

FIGS. 6A and 6B illustrate example bitcodes that each include a special bitcode for indicating a change in the bitcode resolution used to report an avatar's position. This may be relevant because the bitcodes themselves do not indicate whether the position information is in a high resolution format or a low resolution format and, as indicated above, the receiving device needs to know which bitcode resolution is in use before the prefix codes would otherwise conflict. In most if not all cases, a client device or application will assume that the position information is of the same resolution as the previous position received for that avatar (further described below). Accordingly, if a change in resolution occurs, the corresponding bitcodes of FIGS. 6A and 6B may be used to notify the client.

Figure 7:
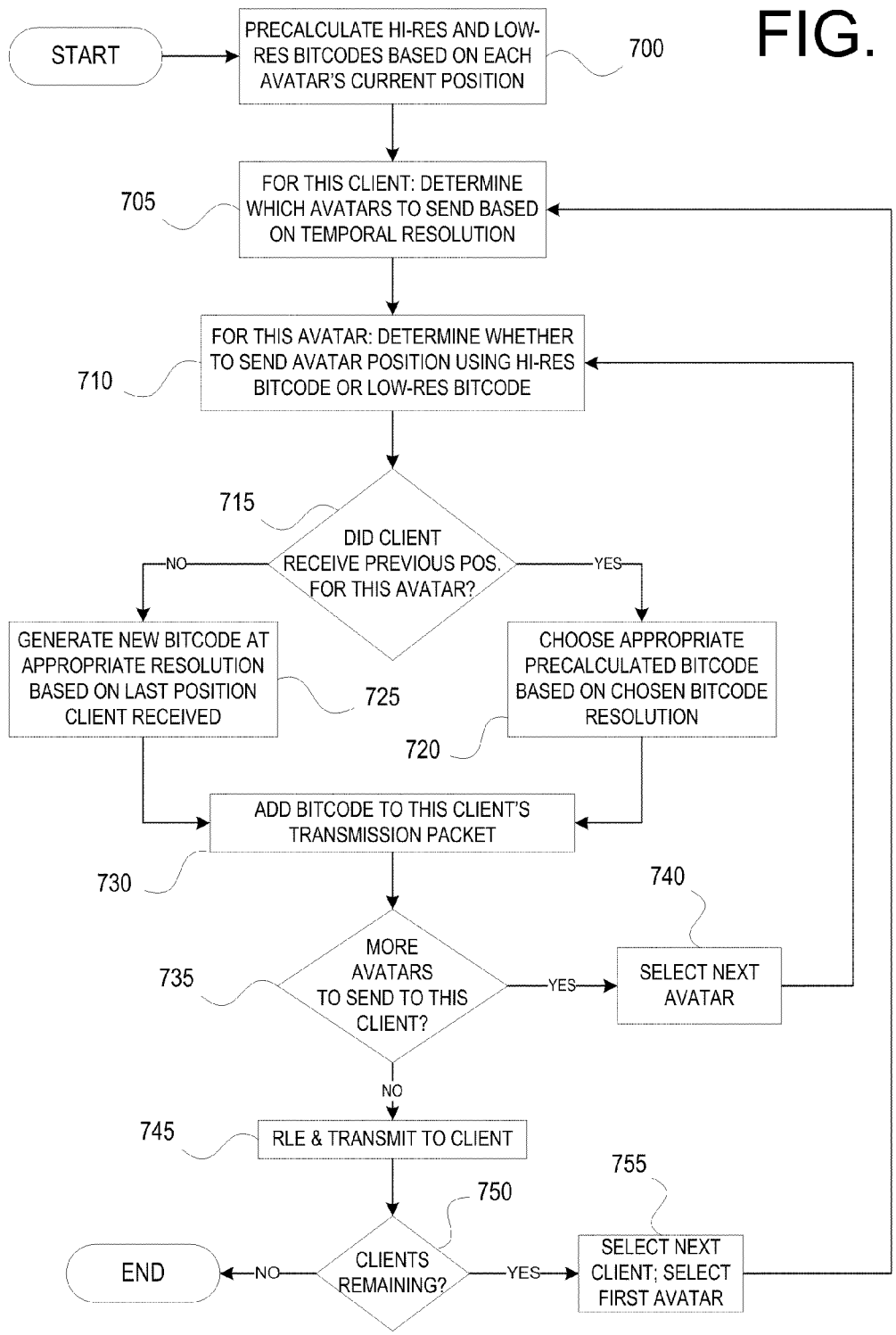
FIG. 7 is a flowchart illustrating an example server method for determining and disseminating position information of avatars in a virtual world according to one or more aspects described herein.

FIG. 7 is a flowchart illustrating an example server method for determining and reporting position information for all avatars in a virtual world to all client devices connected to that virtual world (or to that instance of that virtual world). In step 700, the bitcode generator 321 precalculates the high-resolution and low-resolution bitcodes representative of each avatar's current position based on the previously transmitted position. That is, the server determines, for each avatar, whether or not that avatar has moved since the last position update and, based on that determination, the bitcode generator 321 generates both a high-resolution bitcode and a low-resolution bitcode representative of each avatar's movement (or lack thereof). The server then repeats steps 705-745 for each client device connected to the virtual world, which are described below with respect to one client for whom the position information is being prepared.

Figure 9:
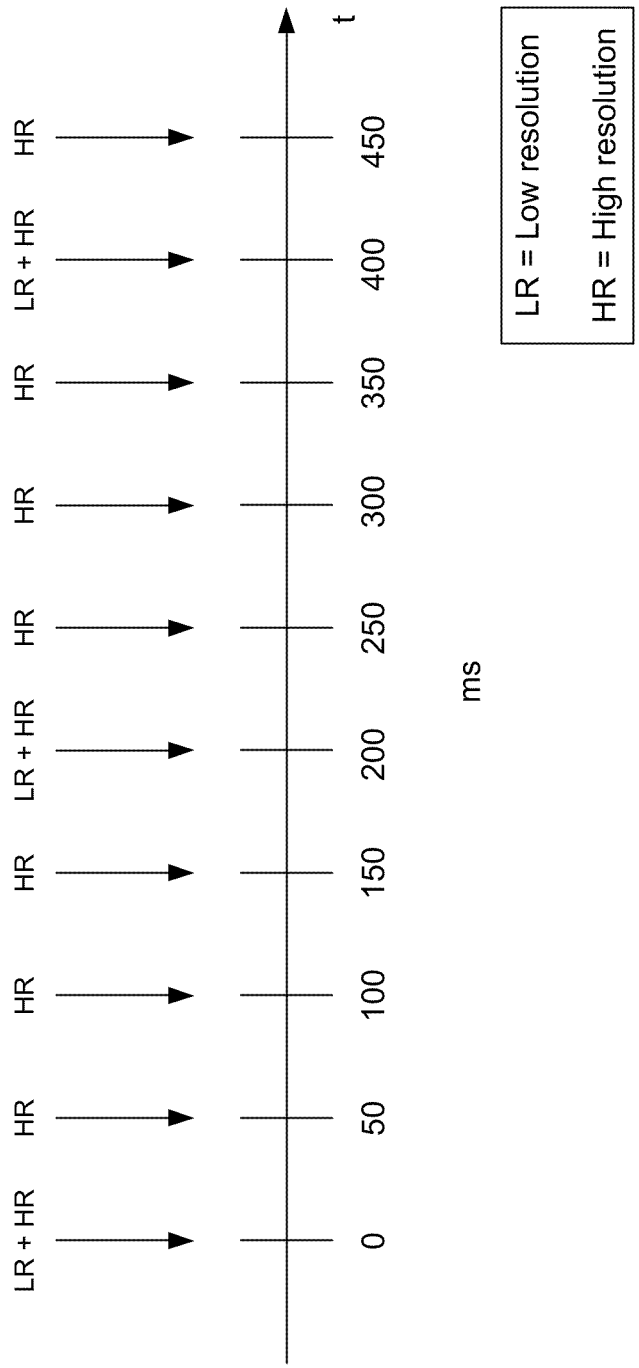
FIG. 9 illustrates an example transmission schedule for high temporal resolution and low temporal resolution bitcode information according to one or more aspects described herein.

In step 705 the server determines which avatars' positions are to be reported to the client based on any temporal resolution being used (see, e.g., FIG. 9 and corresponding description). A temporal resolution may be used to more efficiently manage bandwidth usage. For example, the positions of avatars farther away may be reported at a lower frequency (lower frame rate) than more closely located avatars to reduce the amount of bandwidth used per transmission frame. This example assumes no temporal resolution is being used, and that every avatars' position is reported every frame (a frame refers to a packet of position data transmitted every t seconds, where t represents the shortest amount of time in which the server provides position information, e.g., t=1 sec., t=5 sec., t=250 ms, etc.) using either a high-resolution bitcode or a low-resolution bitcode.

Figure 8:
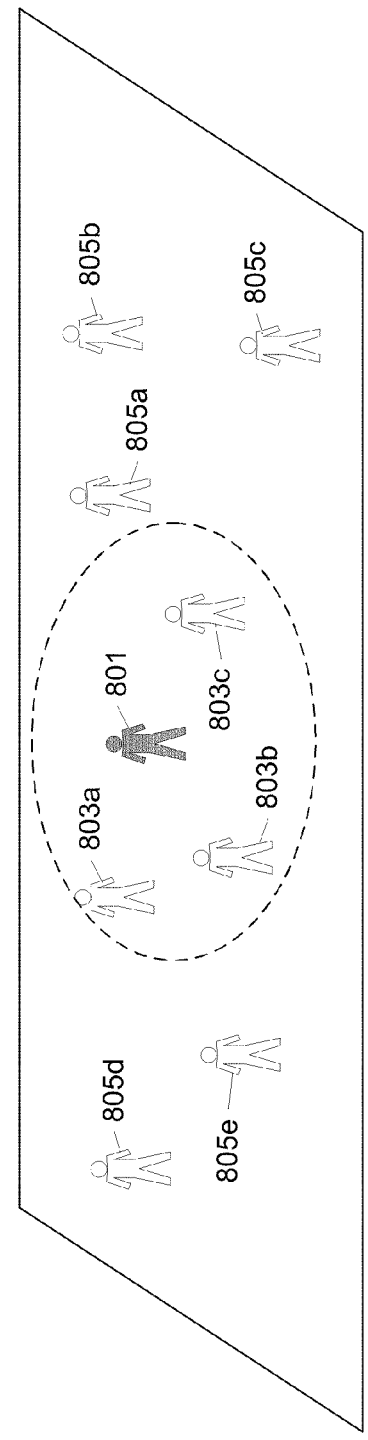
FIG. 8 illustrates an example high resolution bitcode threshold according to one or more aspects described herein.

For every avatar whose position is to be reported to the client in the current frame, the server repeats steps 710-730, described below with respect to one avatar. In step 710, the server determines whether to send the current avatar's position to the client using the precalculated high-resolution bitcode or the precalculated low-resolution bitcode. This determination is made using any desired technique, e.g., using the method described with respect to FIGS. 8 and 11 (below). In step 715 the server determines whether the current client received the immediately previous frame containing position information for this avatar, which is important because if the client did not receive the immediately previous frame with this avatar's position, then the bitcode will result in an incorrect position (because the bitcode only provides an offset from the previous position). Thus, if the current client did receive the previous frame with position information for the current avatar, then the server in step 720 selects the precalculated bitcode for that avatar using the bitcode resolution selected in step 710. If the current client did not receive the previous frame with position information for the current avatar, then the bitcode generator 321 in step 725 generates a new bitcode at the appropriate bitcode resolution based on the last position bitcode reported to the current client.

In step 730 the server adds the selected (from step 720) or newly generated (from step 725) bitcode to the transmission packet to the client for the current frame. In steps 735 and 740, the server determines whether more avatar positions need to be reported to the current client and, if so, repeats steps 710-730 for each additional avatar whose position will be reported.

Once the server has assembled the transmission pack for the client, including positions of all avatars to be reported to the client, the bitcode compressor 320 in step 745 performs a run-length encoding (described below with respect to FIG. 10) and sends the transmission packet to the client. In steps 750 and 755 the server determines whether there are any remaining clients that need to receive position information for the current frame and, if so, repeats steps 705-745 for each such client.

The determination of whether to provide each client a high or low resolution bitcode may depend on a distance between the reference avatar (i.e., the avatar associated with the client to which the bitcode is being sent) and each of the other avatars in the virtual world. With brief reference to FIG. 8, the virtual world server may determine a resolution threshold distance relative to a reference avatar 801. Reference avatar 801 corresponds to a client to which position information for each of other avatars 803 and 805 are to be reported. Resolution threshold may thus be defined as a distance from the position of reference avatar 801. The positions of avatars 803 within a distance below or at the threshold may be reported using high resolution bitcodes while the position of avatars 805 that are located at a distance above or beyond the threshold from reference avatar 801 may be reported user lower resolution bitcodes. Alternatively or additionally, an avatar's view may be taken into account when selecting a resolution. For example, an avatar might only have a viewing scope of 180 degrees. Accordingly, the positions of all other avatars outside of this 180 degree viewing angle might be reported using low resolution bitcodes as well.

Figure 11:
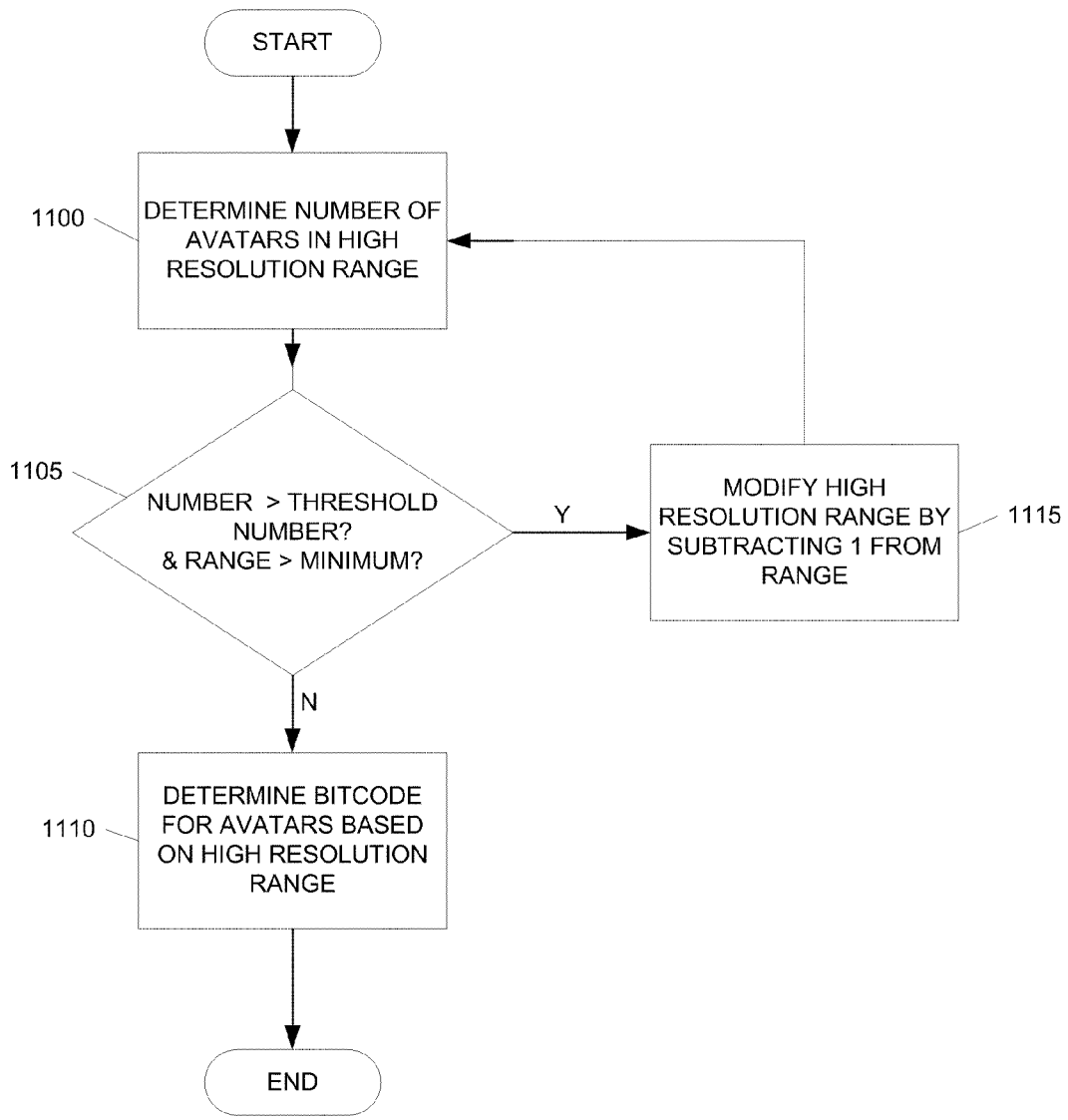
FIG. 11 is a flowchart illustrating an example method for determining and modifying a high resolution range according to one or more aspects described herein.

FIG. 11 illustrates an example method for modifying a high resolution range to compensate for crowded areas in a virtual world. In step 1100, the virtual world system may determine a number of avatars within a high resolution range (e.g., within 100 m). In step 1105, the virtual world system may then determine whether the number of avatars within the high resolution range is above a specified threshold. This threshold may be defined to reduce the potential for having to use significant amounts of bandwidth to transmit many high-resolution bitcodes when an avatar is in a highly populated area. The threshold may be 20 avatars, 50 avatars, 100 avatars, 500 avatars, 1000 avatars or the like. If, the number of avatars is greater than the specified threshold and the range is above the minimum range, the virtual world system may reduce the high resolution range in step 1115 and then go back to step 1100 to test the new range. Once the number of avatars in range is equal to or below the threshold, or if the range cannot be reduced any further, the server will move to step 1110 and select/determine high resolution bitcodes for avatars within the high resolution range and low resolution bitcodes for all other avatars. In one or more arrangements, a minimum high resolution range may be defined such that the high resolution range does not fall below the minimum. In these cases the number of high resolution avatars may exceed the threshold number.

FIG. 9 illustrates an example transmission schedule that provides higher temporal resolution (i.e., frequency) reporting for high resolution bitcodes and lower temporal resolution reporting for low resolution bitcodes. Accordingly, example transmission schedule 900 provides transmission of low resolution bitcode information every 200 milliseconds while high resolution bitcode information is transmitted every 50 milliseconds. Alternatively, low resolution bitcode information may be transmitted at a higher frequency while high resolution bitcode information may be transmitted at a lower frequency to conserve bandwidth.

Figure 10:
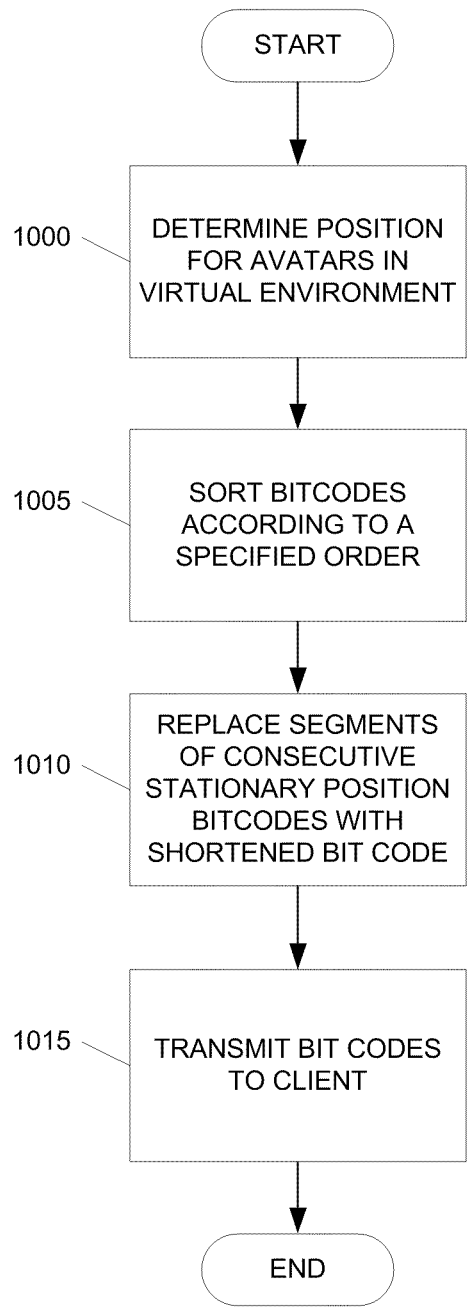
FIG. 10 is a flowchart illustrating an example method for encoding a transmission stream to reduce an amount of bandwidth needed according to one or more aspects described herein.

As indicated above, a virtual world system may use run length encoding (RLE) to optimize bandwidth usage in a transmission stream carrying position information for a plurality of avatars. FIG. 10 illustrates an example method for using run length encoding to optimize transmission streams. In step 1000, a virtual world system may determine position information (e.g., high-resolution bitcodes and low-resolution bitcodes) corresponding to a plurality of avatars that is to be transmitted to a reference avatar client, e.g., as described above with respect to FIG. 7. In step 1005, the system may sort the position information according to a specified order. In one example, the order may be defined as follows: 1) avatars for which a high resolution bitcode indicating movement was sent in the previous update, 2) avatars for which a high resolution bitcode indicating no movement was sent in the previous update, 3) avatars for which a low resolution bitcode indicating no movement was sent in the previous update, and 4) avatars for which a low resolution bitcode indicating movement was sent in the previous update. Each grouping may be further sorted based on an avatar ID known to both the server and each client. The order in which avatar position information is transmitted may vary, and may include any predefined and agreed upon sort order between the server and the clients. Accordingly, additional information and data specifying the order of avatars/clients does not need to be included in the transmission because each client expects the data to be received in the order sorted by the server. Additional bandwidth is saved because there is no need to send avatar ID information with each bitcode in the transmission stream.

Once sorted, the system in step 1010 may then replace segments of consecutive stationary avatar positions with one of the RLE bitcodes (and data where applicable) in Table 1:

TABLE 1

RLE Bitcodes

| RLE Bitcode | RLE Data | Description |
|---|---|---|
| 0 00 | not applicable | The next one (1) avatar is stationary. |
| 0 01 | nnnn | The next nnnn avatars are stationary, where nnnn represents a binary number from 1 to 16 |
| 0 10 | nnnnnnnn | The next nnnnnnnn avatars are stationary, where nnnnnnnn represents a binary number from 1 to 256 |
| 0 11 | nnnnnnnnnnn | The next nnnnnnnnnnn avatars are stationary, where nnnnnnnnnnn represents a binary number from 1 to 2048 |

For example, a bitcode of '0 00' may be used to indicate that only the next user in the expected avatar order is stationary, '0 01 nnnn' may be used to indicate that the next nnnn (up to $2^4$) users in the list are stationary, '0 10 nnnnnnnn' to indicate that the next nnnnnnnn (up to $2^8$) users in the list are stationary, and '0 11 nnnnnnnnnnn' to indicate that the next nnnnnnnnnnn (up to $2^{11}$) users in the list are stationary. Any pre-agreed correlation between the RLE bitcode and the value of m where the bitcode is followed by a binary number from 1 to $2^m$ may be used. $2^{11}$ (2048) was chosen for the final RLE bitcode because in this example each instance of the virtual world can have at most 2000 users at one time, so there would never be a need to indicate more than $2^{11}$ users being stationary. The RLE bitcodes are thus used to replace instances of '0' bitcodes indicating that an avatar position is stationary and no additional information is being provided. Which RLE bitcode is used depends on the number of consecutive '0' bitcodes in the packet being prepared for sending to a specific client. The RLE bitcodes thereby further reduce bandwidth by replacing multiple hi/low-resolution bitcodes (except as noted below) with a single RLE bitcode. In step 1015, the bitcodes may be transmitted to the client of the reference avatar.

RLE bitcodes may be modified or added to accommodate additional avatar positions, e.g., if greater than 2048 consecutive avatars in a transmission stream are stationary. While a change from a single high-resolution bitcode (or low-resolution bitcode) '0' to the RLE bitcode '0 00' actually results in an increase of bandwidth from one to three bits, the net effect of using the RLE bitcodes decreases overall bandwidth based on the sort order described above. The high-resolution bitcode and low-resolution bitcode '0' cannot be used in combination the with RLE bitcodes because '0' is a prefix of the RLE bitcodes, and would introduce ambiguity into the prefix code system in use. Additionally, if additional non-position information follows a position bitcode, that position bitcode might not be replaced so that a client is aware of the following additional information. Stated differently, when additional information needs to be provided, the virtual world server sends the code '1 100' for that avatar instead of subsuming the avatar within other consecutive stationary avatar positions.

Figure 12:
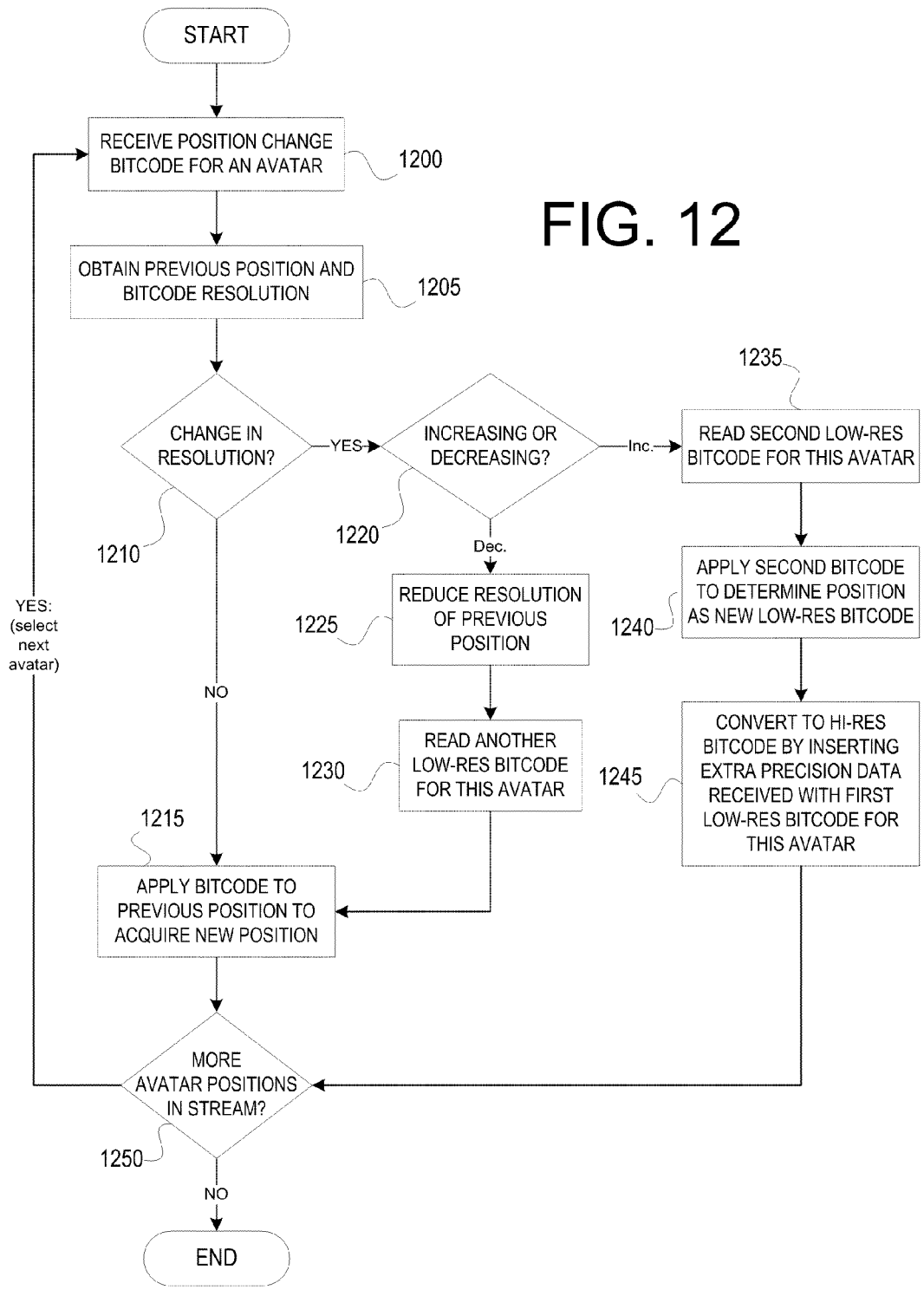
FIG. 12 is a flowchart illustrating an example client method for receiving and updating position information for avatars in a virtual world according to one or more aspects described herein.

FIG. 12 illustrates an example method for receiving and processing position information transmission streams by client devices. The client may first undo the RLE compression as described above, such that the RLE bitcodes are expanded and replaced with multiple stationary '0' bitcodes instead. The method in FIG. 12 is then performed by the client for each avatar.

In step 1200 the client identifies an avatar for which an individual bitcode is received. The client in step 1205 looks up the previously known position of the avatar as well as the bitcode resolution last used for that avatar, and assumes the incoming bitcode is the same resolution. In step 1210 the client determines, using the assumed bitcode resolution, whether the bitcode indicates a change in resolution. If no change in resolution is indicated, then in step 1215 the client applies the new bitcode to the previously known position to obtain a new position for that avatar, and proceeds to step 1250.

However, if the bitcode indicates a change of resolution, then in step 1220 the client determines whether the resolution is increasing (going from low to high resolution bitcode) or decreasing (going from high to low resolution bitcode). If bitcode resolution is decreasing, then in step 1225 the client reduces the previously known position of the avatar from the high resolution grid using the low resolution grid (i.e., in this example the client knows there are 64×64 high-resolution grid cells per low-resolution grid cell, and calculates accordingly, keeping the same layer). In step 1230 the client then reads an additional low-resolution bitcode, and proceeds to step 1215 where the client applies the low-resolution bitcode to the previously known position to determine the current position.

If in step 1220 the bitcode indicates that bitcode resolution is increasing, then in step 1235 the client reads a second low-resolution bitcode for the avatar, and in step 1240 applies the second low-resolution bitcode to the previously known position in order to make sure that the client has the correct position for the avatar based on low-resolution bitcodes. In step 1245 the client applies the additional precision information received with the first low-resolution bitcode to the position calculated by the client in step 1240, to arrive at a position usable with future high-resolution bitcodes. The client then proceeds to step 1250.

In step 1250 the client determines whether the transmission stream contains any bitcodes for additional avatar positions and, if so, selects the next avatar bitcode and repeats steps 1200-1250 for each additional avatar bitcode received.

After determining each avatars' new position, or upon determining each avatars' new position, the client may re-render the graphical user interface providing the graphical depiction of the virtual world to reflect the updated positions. The client might depict the avatar as being located in the center of the grid cell in which it is located, or may extrapolate a location within the grid cell to depict the avatar based on the avatar's history of movement, whether the avatar recently moved into the grid cell, etc.

It should be understood that any of the method steps, procedures or functions described herein may be implemented in modified form, for example, by combining, reordering, and/or splitting steps, modules, functions, programs, objects, etc. In addition, the techniques described herein may be implemented using one or more processors in combination with executable instructions that cause the processors and other components to perform the method steps, procedures or functions. As used herein, the terms "processor" and "computer" whether used alone or in combination with executable instructions stored in a memory or other computer-readable storage medium should be understood to encompass any of various types of well-known computing structures including but not limited to one or more microprocessors, special-purpose computer chips, field-programmable gate arrays (FPGAS), controllers, application-specific integrated circuits (ASICS), combinations of hardware/firmware/software, or other special or general-purpose processing circuitry. In addi-

I claim:

1. A method for communicating position movement information for one or more avatars in a virtual world, the method comprising:
   determining a grid resolution at which to report position movement information for a first avatar, wherein the grid resolution is based on selecting a grid from a plurality of grids having different grid resolutions, wherein each grid corresponds to the virtual world, wherein the selected grid is selected based on a distance between the first avatar and a second avatar in the virtual world, and wherein the second avatar corresponds to a client to which the position movement information is transmitted;
   determining the position movement information of the first avatar by comparing a current position of the first avatar in the selected grid with a previous position of the first avatar in the selected grid; and
   transmitting to the client the position movement information of the first avatar.

2. The method of claim 1, wherein selecting the grid comprises:
   determining whether the distance is below a high resolution range threshold;
   in response to determining that the distance is at or below the high resolution range threshold, selecting a first grid having a first resolution; and
   in response to determining that the distance is above the high resolution range threshold, selecting a second grid having a second resolution lower than the first resolution.

3. The method of claim 1, wherein determining the position movement information comprises generating a movement offset for the first avatar within the selected grid.

4. The method of claim 1, further comprising, based on the determined grid resolution, generating a bitcode representing the position movement information.

5. The method of claim 1, further comprising:
   determining a temporal resolution with which to transmit the position movement information; and
   scheduling the transmission of the position movement information based on the determined temporal resolution.

6. The method of claim 1, further comprising:
   determining a second grid resolution at which to report position movement information for third avatar, wherein the second grid resolution is based on selecting a second grid from the plurality of grids;
   determining the position movement information of the third avatar by comparing a current position of the third avatar in the second selected grid with a previous position of the third avatar in the second selected grid; and
   transmitting to the client the position movement information of the third avatar.

7. The method of claim 1, wherein transmitting to the client comprises transmitting the position movement information in a transmission stream comprising a plurality of bitcodes corresponding to position movement information of a plurality of avatars and wherein the method further comprises:
   identifying a set of two or more consecutive bitcodes indicating no change in position of a corresponding set of two or more avatars; and
   condensing the set of two or more consecutive bitcodes to a shortened bitcode.

8. The method of claim 1, wherein selecting the grid comprises:
   identifying a resolution range;
   determining a number of avatars within the resolution range from the second avatar;
   determining whether the number of avatars within the resolution range is above an avatar threshold; and
   in response to determining that the number of avatars within the resolution range is above the avatar threshold, modifying the resolution range until the number of avatars within the resolution range is within the avatar threshold.

9. The method of claim 8, wherein position movement information for avatars within the resolution range is reported based on the selected grid, and position movement information of avatars outside the resolution range is reported based on a second grid having a lower resolution than the first grid.

10. A method for communicating position movement information for one or more avatars in a virtual world, the method comprising:
    determining a grid resolution at which to report position movement information for a first avatar, wherein the grid resolution is based on selecting a grid from a plurality of grids having different grid resolutions, wherein each grid corresponds to the virtual world;
    determining the position movement information of the first avatar by comparing a current position of the first avatar in the selected grid with a previous position of the first avatar in the selected grid; and
    transmitting to a client the position movement information of the first avatar, wherein the position movement information is transmitted in a transmission stream comprising a plurality of bitcodes corresponding to position movement information for a plurality of avatars.

11. The method of claim 10, wherein the position movement information for the plurality of avatars is sorted in the transmission stream according to a resolution and type of past position movement information provided to the client in a previous transmission.

12. The method of claim 10, wherein the plurality of avatars includes all avatars in the virtual world.

13. A method for providing position information for a plurality of avatars in a virtual world, the method comprising:
    a virtual world server determining a current position of each of a plurality of avatars in the virtual world, wherein the plurality of avatars includes all avatars in the virtual world;
    generating first position offset data for each of the plurality of avatars based on the current position of each of the plurality of avatars compared to a corresponding previous position of each of the plurality of avatars in a first grid corresponding to the virtual world;
    generating second position offset data for each of the plurality of avatars based on the current position of each of the plurality of avatars compared to a corresponding previous position of each of the plurality of avatars in a second grid corresponding to the virtual world, wherein the first grid and the second grid have different resolutions;

selecting, for each of the plurality of avatars, only one of the first position offset data and the second position offset data for transmission to a first virtual world client device; and transmitting to the first virtual world client device, the selected position offset data for at least all of the plurality of avatars.

14. The method of claim 13, further comprising:

selecting, for each of the plurality of avatars, only one of the first position offset data and the second position offset data for transmission to a second virtual world client device, wherein the position offset data selected for transmission to the second virtual world client device is different from the position offset data selected for transmission to the first virtual world client device; and transmitting to the second virtual world client device, the selected position offset data for at least all of the plurality of avatars except for an avatar corresponding the second virtual world client device.

15. The method of claim 13, wherein each position offset data includes a bitcode and wherein a format of the bitcode is based on a type of position change of an avatar.

16. The method of claim 15, wherein the virtual world is a three dimensional virtual world and wherein the type of position change of the avatar includes a change in a vertical position of the avatar in the virtual world.

17. The method of claim 15, wherein the type of position change includes no movement.

18. The method of claim 13, further comprising determining whether the first virtual world client device received an immediately previous set of position offset data;

in response to determining that the first virtual world client device did not received the immediately previous set of position offset data, generating a custom set of position offset data based on avatar movements since the first virtual world client device last received position offset data; and transmitting the custom set of position offset data to the first virtual world client device.

19. The method of claim 18, wherein the custom set of position offset data is generated based on a default previous position for each of the plurality of avatars.

20. A method comprising:

receiving, at a virtual world client device, position offset information for a plurality of avatars in a virtual world;

for each avatar for which position offset information is received:

determining a resolution of the position offset information, and applying the received position offset information based on the determined resolution to determine a new position of the avatar corresponding to the position offset information, wherein position offset information corresponding to a first avatar is received in a first resolution, and position offset information corresponding to a second avatar is received in a second resolution; and determining, based on a received bitcode, that position offset information corresponding to a third avatar has changed from the first resolution to the second resolution.

21. The method of claim 20, wherein the plurality of avatars includes all avatars in the virtual world.

22. The method of claim 21, wherein the position offset information of plurality of avatars is sorted based on a resolution of an immediately previously received set of position offset information.

23. The method of claim 22, wherein the position offset information of the plurality of avatars is further sorted based on a type of position change indicated in the immediately previously received position offset information.

24. The method of claim 20, wherein the first resolution is lower than the second resolution, said method further comprising determining the position of the third avatar using additional precision information received with the received bitcode.

25. A virtual world server system, comprising:

one or more processors;

one or more network interfaces; and computer memory storing executable instructions that, when executed by the one or more processors, perform a method for communicating position movement information for one or more avatars in a virtual world to one or more client devices in communication with the virtual world server system via the one or more network interfaces, said method comprising:

determining a grid resolution at which to report position movement information for a first avatar, wherein the grid resolution is based on selecting a grid from a plurality of grids having different grid resolutions, wherein each grid corresponds to the virtual world, wherein the selected grid is selected based on a distance between the first avatar and a second avatar in the virtual world, and wherein the second avatar corresponds to a client to which the position movement information is transmitted;

determining the position movement information of the first avatar by comparing a current position of the first avatar in the selected grid with a previous position of the first avatar in the selected grid; and transmitting to the client the position movement information of the first avatar.

26. The system of claim 25, wherein selecting the grid comprises:

determining whether the distance is below a high resolution range threshold;

in response to determining that the distance is at or below the high resolution range threshold, selecting a first grid having a first resolution; and in response to determining that the distance is above the high resolution range threshold, selecting a second grid having a second resolution lower than the first resolution.

27. The system of claim 25, wherein determining the position movement information comprises generating a movement offset for the first avatar within the selected grid.

28. The system of claim 25, wherein said method further comprises, based on the determined grid resolution, generating a bitcode representing the position movement information.

29. The system of claim 25, wherein said method further comprises:

determining a temporal resolution with which to transmit the position movement information; and scheduling the transmission of the position movement information based on the determined temporal resolution.

30. The system of claim 25, wherein said method further comprises:

determining a second grid resolution at which to report position movement information for a third avatar, wherein the second grid resolution is based on selecting a second grid from the plurality of grids;

determining the position movement information of the third avatar by comparing a current position of the third avatar in the second selected grid with a previous position of the third avatar in the second selected grid; and transmitting to the client the position movement information of the third avatar.

31. The system of claim 25, wherein transmitting to the client comprises transmitting the position movement information in a transmission stream comprising a plurality of bitcodes corresponding to position movement information of a plurality of avatars and wherein the method further comprises:

identifying a set of one or more consecutive bitcodes indicating no change in position of a corresponding set of two or more avatars; and replacing the set of one or more consecutive bitcodes with a run length encoding bitcode.

32. The system of claim 25, wherein selecting the grid comprises:

identifying a resolution range;

determining a number of avatars within the resolution range from the second avatar;

determining whether the number of avatars within the resolution range is above an avatar threshold; and in response to determining that the number of avatars within the resolution range is above the avatar threshold, modifying the resolution range until the number of avatars within the resolution range is within the avatar threshold.

33. The system of claim 32, wherein position movement information for avatars within the resolution range is reported based on the selected grid, and position movement information of avatars outside the resolution range is reported based on a second grid having a lower resolution than the first grid.

34. The system of claim 25, wherein the position movement information is transmitted in a transmission stream comprising a plurality of bitcodes corresponding to position movement information for a plurality of avatars, wherein the position movement information for the plurality of avatars is sorted in the transmission stream according to a resolution of past position movement information provided to the client in a previous transmission.

35. A virtual world server system, comprising:

one or more processors;

one or more network interfaces; and computer memory storing executable instructions that, when executed by the one or more processors, perform a method for providing position information for a plurality of avatars in a virtual world, the method comprising:

determining a current position of each of a plurality of avatars in the virtual world, wherein the plurality of avatars includes all avatars in the virtual world;

generating first position offset data for each of the plurality of avatars based on the current position of each of the plurality of avatars compared to a corresponding previous position of each of the plurality of avatars in a first grid corresponding to the virtual world;

generating second position offset data for each of the plurality of avatars based on the current position of each of the plurality of avatars compared to a corresponding previous position of each of the plurality of avatars in a second grid corresponding to the virtual world, wherein the first grid and the second grid have different resolutions;

selecting, for each of the plurality of avatars, only one of the first position offset data and the second position offset data for transmission to a first virtual world client device; and transmitting to the first virtual world client device, the selected position offset data for at least all of the plurality of avatars.

36. The system of claim 35, wherein said method further comprises:

selecting, for each of the plurality of avatars, only one of the first position offset data and the second position offset data for transmission to a second virtual world client device, wherein the position offset data selected for transmission to the second virtual world client device is different from the position offset data selected for transmission to the first virtual world client device; and transmitting to the second virtual world client device, the selected position offset data for at least all of the plurality of avatars other than an avatar corresponding the second virtual world client device.

37. The system of claim 35, wherein each position offset data includes a bitcode and wherein a format of the bitcode is based on a type of position change of an avatar.

38. The system of claim 35, wherein each bitcode conforms to a prefix coding scheme.

39. The system of claim 35, wherein the type of position change includes no movement.

40. The system of claim 35, wherein said method further comprises:

determining whether the first virtual world client device received an immediately previous set of position offset data;

in response to determining that the first virtual world client device did not received the immediately previous set of position offset data, generating a custom set of position offset data based on avatar movements since the first virtual world client device last received position offset data; and transmitting the custom set of position offset data to the first virtual world client device.

41. The system of claim 40, wherein the custom set of position offset data is generated based on a default previous position for each of the plurality of avatars.

42. One or more physical computer memory storing executable instructions that, when executed by a virtual world client device, perform a method for receiving avatar position information, said method comprising:

receiving position offset information for a plurality of avatars in a virtual world;

for each avatar for which position offset information is received:

determining a resolution of the position offset information, and applying the received position offset information based on the determined resolution to determine a new position of the avatar corresponding to the position offset information, wherein position offset information corresponding to a first avatar is received in a first resolution, and position offset information corresponding to a second avatar is received in a second resolution; and determining, based on a received bitcode, that position offset information corresponding to a third avatar has changed from the first resolution to the second resolution.

43. The computer memory of claim 42, wherein the plurality of avatars includes all avatars in the virtual world.

44. The computer memory of claim 43, wherein the position offset information of the plurality of avatars is sorted at least in part based on a resolution of an immediately previously received set of position offset information.

45. The computer memory of claim 43, wherein the position offset information of the plurality of avatars is sorted at least in part based on a type of position change indicated in the immediately previously received position offset information.

46. The computer memory of claim 42, wherein the first resolution is lower than the second resolution, said method further comprising determining the position of the third avatar using additional precision information received with the received bitcode.

* * * * *